US011073611B2

(12) United States Patent
Corcos et al.

(10) Patent No.: US 11,073,611 B2
(45) Date of Patent: Jul. 27, 2021

(54) HIGH SPATIAL RESOLUTION 3D RADAR BASED ON A SINGLE SENSOR

(71) Applicant: International Business Machines Corporation, Armonk, NY (US)

(72) Inventors: Dan Corcos, Tel Aviv (IL); Danny Elad, Moshav Liman (IL); Ofer Markish, Nesher (IL); Thomas E Morf, Gross (CH); Jakob Vovnoboy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 15/462,973

(22) Filed: Mar. 20, 2017

(65) Prior Publication Data
US 2018/0267140 A1    Sep. 20, 2018

(51) Int. Cl.
| G01S 13/89 | (2006.01) |
| G01S 13/28 | (2006.01) |
| G01S 7/03 | (2006.01) |
| G01S 13/34 | (2006.01) |

(52) U.S. Cl.
CPC ........... *G01S 13/89* (2013.01); *G01S 7/03* (2013.01); *G01S 13/282* (2013.01); *G01S 13/288* (2013.01); *G01S 13/34* (2013.01)

(58) Field of Classification Search
CPC ........ G01S 13/89; G01S 13/34; G01S 13/288; G01S 7/03; G01S 13/282
USPC .................................................. 342/131, 132
See application file for complete search history.

(56) References Cited

U.S. PATENT DOCUMENTS

| 5,305,009 A | * | 4/1994 | Goutzoulis | .............. H01Q 3/38 |
| | | | | 342/157 |
| 6,686,867 B1 | * | 2/2004 | Lissel | ..................... G01S 7/032 |
| | | | | 342/27 |
| 7,535,409 B1 | | 5/2009 | Choe et al. | |
| 7,639,171 B2 | | 12/2009 | Alland et al. | |

(Continued)

FOREIGN PATENT DOCUMENTS

| JP | H09284035 A | 10/1997 |
| JP | 2010002350 A | 1/2010 |

(Continued)

OTHER PUBLICATIONS

Jaeschke, T., et al, A 204 GHz Ultra-Wideband FMCW Radar System with On-Chip Antennas for High Resolution Radar Imaging, 2013, IEEE (Year: 2013).*

(Continued)

*Primary Examiner* — Marcus E Windrich
(74) *Attorney, Agent, or Firm* — Gregory J. Kirsch

(57) ABSTRACT

A novel system that allows for 3D radar detection that simultaneously captures the lateral and depth features of a target is disclosed. This system uses only a single transceiver, a set of delay-lines, and a passive antenna array, all without requiring mechanical rotation. By using the delay lines, a set of beat frequencies corresponding to the target presence can be generated in continuous wave radar systems. Likewise, in pulsed radar systems, the delays also allow the system to determine the 3D aspects of the target(s). Compared to existing solutions, the invention, in embodiments, allows for the implementation of simple, reliable, and power efficient 3D radars.

19 Claims, 3 Drawing Sheets

(56) References Cited

U.S. PATENT DOCUMENTS

| | | | |
|---|---|---|---|
| 7,986,397 B1* | 7/2011 | Tiemann | G01S 17/89 356/5.09 |
| 8,144,052 B2 | 3/2012 | Cooper et al. | |
| 8,937,724 B2* | 1/2015 | Vakoc | A61B 5/6852 356/497 |
| 9,254,089 B2* | 2/2016 | Tearney | A61B 5/0084 |
| 9,354,307 B2 | 5/2016 | Beeri et al. | |
| 9,411,039 B2 | 8/2016 | Dehlink et al. | |
| 9,778,355 B2* | 10/2017 | Li | G01S 13/931 |
| 2007/0187632 A1* | 8/2007 | Igarashi | A61B 5/0048 250/559.36 |
| 2007/0285315 A1* | 12/2007 | Davis | G01S 3/74 342/377 |
| 2008/0297400 A1* | 12/2008 | Hansen | G01S 13/931 342/70 |
| 2009/0267822 A1* | 10/2009 | Shinoda | G01S 7/352 342/70 |
| 2010/0109938 A1* | 5/2010 | Oswald | G01S 13/522 342/90 |
| 2011/0090100 A1* | 4/2011 | Shemirani | H01Q 3/40 341/100 |
| 2011/0273325 A1* | 11/2011 | Goldman | G01S 3/46 342/146 |
| 2012/0169528 A1* | 7/2012 | Edvardsson | H01Q 1/225 342/124 |
| 2013/0027240 A1* | 1/2013 | Chowdhury | G01S 7/032 342/94 |
| 2013/0093598 A1* | 4/2013 | Duncan | G01K 11/32 340/854.7 |
| 2013/0100250 A1* | 4/2013 | Raskar | G01S 7/4808 348/46 |
| 2015/0346340 A1* | 12/2015 | Yaacobi | G01S 7/4915 356/5.11 |
| 2016/0007315 A1* | 1/2016 | Lundgreen | G01S 3/46 455/67.11 |
| 2016/0116582 A1 | 4/2016 | Chang | |
| 2017/0074980 A1* | 3/2017 | Adib | G01S 13/72 |
| 2018/0081049 A1* | 3/2018 | Christie | H01Q 3/245 |
| 2018/0251870 A1* | 9/2018 | Simone | A63B 53/0466 |

FOREIGN PATENT DOCUMENTS

| | | |
|---|---|---|
| JP | 2010054344 A | 3/2010 |
| JP | 2012168157 A | 9/2012 |

OTHER PUBLICATIONS

Lamminen, Antti, et al, 60-GHz Patch Antennas and Arrays on LTCC with Embedded-Cavity Substrates, Sep. 2008, IEEE Transactions on Antennas and Propagation, vol. 56 (Year: 2008).*

Stralka, John, et al, Constant Envelope Orthogonal Frequency-Divsion Multiplexing Phase Modulation for Radar Pulse Compression, 2007, IEEE (Year: 2007).*

Tang et al., "Single transceiver-based time division multiplexing multiple-input—multiple-output digital beamforming radar system: concepts and experiments", IET Radar Sonar Navig., 2014, vol. 8, Iss. 4, p. 368-375.

Arbabian et al., "A 94 GHz mm-Wave-to-Baseband Pulsed-Radar Transceiver with Applications in Imaging and Gesture Recognition", IEEE journal of solid-state circuits, vol. 48, No. 4, Apr. 2013, p. 1055-1071.

Wiesbeck, "The Radar of the Future", European Radar Conference (EuRAD), Oct. 9-11, 2013, p. 137-140.

Steinhauer et al., "Millimeter-Wave-Radar Sensor Based on a Transceiver Array for Automotive Applications", IEEE transactions on microwave theory and techniques, vol. 56, No. 2, Feb. 2008, p. 261-269.

Notice of Reasons for Refusal, issued by Japanese Patent Office in corresponding Japanese Patent Application No. 2019-549548 dated May 25, 2021.

* cited by examiner

HIGH SPATIAL RESOLUTION 3D RADAR BASED ON A SINGLE SENSOR

FIELD OF TECHNOLOGY

The present invention relates to the technical field of radar. In particular, the present invention relates to 3D single sensor radar systems.

BACKGROUND OF THE INVENTION

In three-dimensional (3D) radar detection, the profile and depth features of every area (pixel) in a target surface are reconstructed. Equivalently, the range of multiple targets can be detected. Existing methods for 3D detection use multiple active components or require mechanical steering capabilities. These conventional 3D radars are equipped with an array of analog or digital active transceivers or are required to mechanically rotate a large antenna with narrow beam towards each pixel. Few, if any, methods use only single transceiver and a passive array and lack mechanical components.

A typical approach to 3D detection is the phased array radar. A phased array is composed of an antenna array and a collection of transceivers and phase-shifters. The beam of the array can be electronically scanned by setting each antenna phase such that a constructive interference will occur in a specific point in space so as to steer the beam to that direction. Using the scanning capability, the system can direct the beam to a specific area (pixel) in the target or to a specific target among multiple targets. The range of each target can then be measured by modulating the transceiver signal using various techniques such as FMCW detection, pulsed radar, etc.

Another approach is digital beamforming (DBF). In DBF radars, each antenna element is connected to a downconverter and multiple analog-to-digital (A/D) units. The digitized signals from each A/D are summed and processed digitally to create the beamforming. The radar transmitter is synchronized with the receiver to allow simultaneous range detection of multiple targets.

In a mechanically rotating radar, a single radar transceiver is connected to a large antenna, such as a reflector antenna. Different targets or surface topology can be reconstructed by mechanically rotating the antenna and measuring the range at each direction of observation.

Tradeoffs exist between analog and digital beamforming techniques. In DBF, the antennas stare constantly at the targets, and simultaneous detection of multiple pixels is possible. This requires full RF-to-baseband chains and heavy computational resources. In ABF, multiple RF transceivers and phase-shifters steer the beam to a single pixel at a given time and therefore the illumination duration is limited and the SNR can degrade. Overall, both digital and analog approaches require multiple active transceivers in order to detect the pixels or the target 3D topology. A single transceiver can be used if a mechanical steering mechanism is available, but in this case, the scanning rate may be limited compared to electronic (analog or digital) methods and the mechanical components may affect the system reliability. In summary, all the above described solutions are complicated and power consuming compared a single transceiver and passive array with delays based system.

SUMMARY OF INVENTION

Disclosed is a novel system that allows for 3D radar detection that simultaneously captures the lateral and depth features of a target. This system uses only a single transceiver, a set of delay-lines, and a passive antenna array, all without requiring mechanical rotation. Compared to existing solutions, the invention, in embodiments, allows for the implementation of simple, reliable, and power efficient 3D radars.

In embodiments, the present invention captures the lateral and depth information of a target using only a single transceiver, splitter/combiner, delay-lines with known values and order, and a passive antenna array. No mechanical rotation of the antennas is required. The transceiver can be based on FMCW, pulses, etc. In the FMCW case, each pixel is illuminated through a different delay such that a unique beat frequency is generated for each pixel and all the ranges can be detected at ones.

Embodiments of the invention can use various microwave components. The splitter-combiner can be a Wilkinson divider, T divider, or a coupling based network. The delay lines can be implemented using waveguides or microstrip lines.

In embodiments, an apparatus for 3D detection comprises a single radar transmitter connected to a set of at least one delay lines, a set of at least one antenna, wherein each antenna in the set of at least one antennas is individually coupled to a delay line in the set of at least one delay lines, a radar receiver configured to receive a reflected radar signal, and a signal processing unit, where the radar transmitter is configured to generate a radar signal that is delayed by the set of at least one delay lines, transmitted by the set of at least one antennas, and directed by the lens, and where the signal processing unit is configured to determine a 3D target parameter based on a set of beat frequencies in the received reflected radar signal.

In a preferred embodiment, the radar signal comprises a continuous wave radar signal. In an optional embodiment, the continuous wave radar signal comprises a frequency modulated continuous wave radar signal.

In an alternative embodiment, the radar signal comprises a pulsed radar signal. In an optional embodiment, the pulsed radar signal comprises a frequency modulated pulsed radar signal or a phase modulated pulsed radar signal.

In an advantageous embodiment, the single radar transmitter is connected to the set of at least one delay lines by a coupler. The coupler may comprise a Wilkinson divider, a coupling-based network, or a T divider in various embodiments. In advantageous embodiments, the set of at least one delay lines comprises a set of microstrip lines. In an alternative embodiment, the set of at least one delay lines comprises a set of waveguides.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
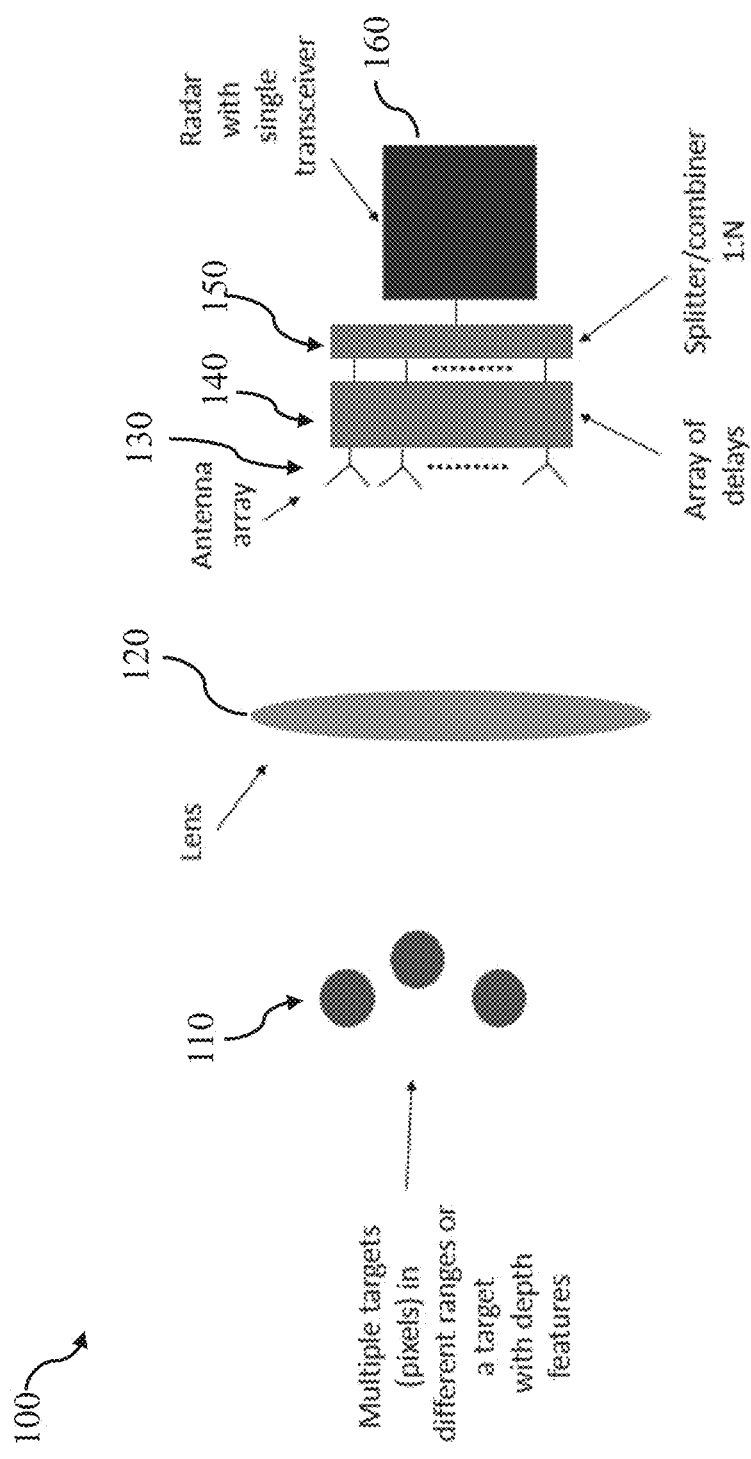
FIG. 1 illustrates a high spatial resolution 3D radar system based on a single sensor, according to an embodiment of the invention.

FIG. 1 illustrates a high spatial resolution 3D radar system 100 based on a single sensor, according to an embodiment of the invention. Here, the transmitter in the radar 160 generates a signal that split by a splitter/combiner 150 into different antennas where each antenna of the antenna array 130 is connected a different delay-line in the array of delay lines 140. Then, the lens 120 directs the signal from each antenna in the antenna array 130 to a different area on the target(s) 110 or to a different target. Finally, the reflected signal from each target would arrive back to the same antenna that generated the signal, cross the splitter/combiner 150 and reach the receiver of the radar 160. Since each antenna is connected to a different delay line whose delay and position are known in advance, the system can detect the range of each pixel or reconstruct the surface topology of the target.

Figure 2:
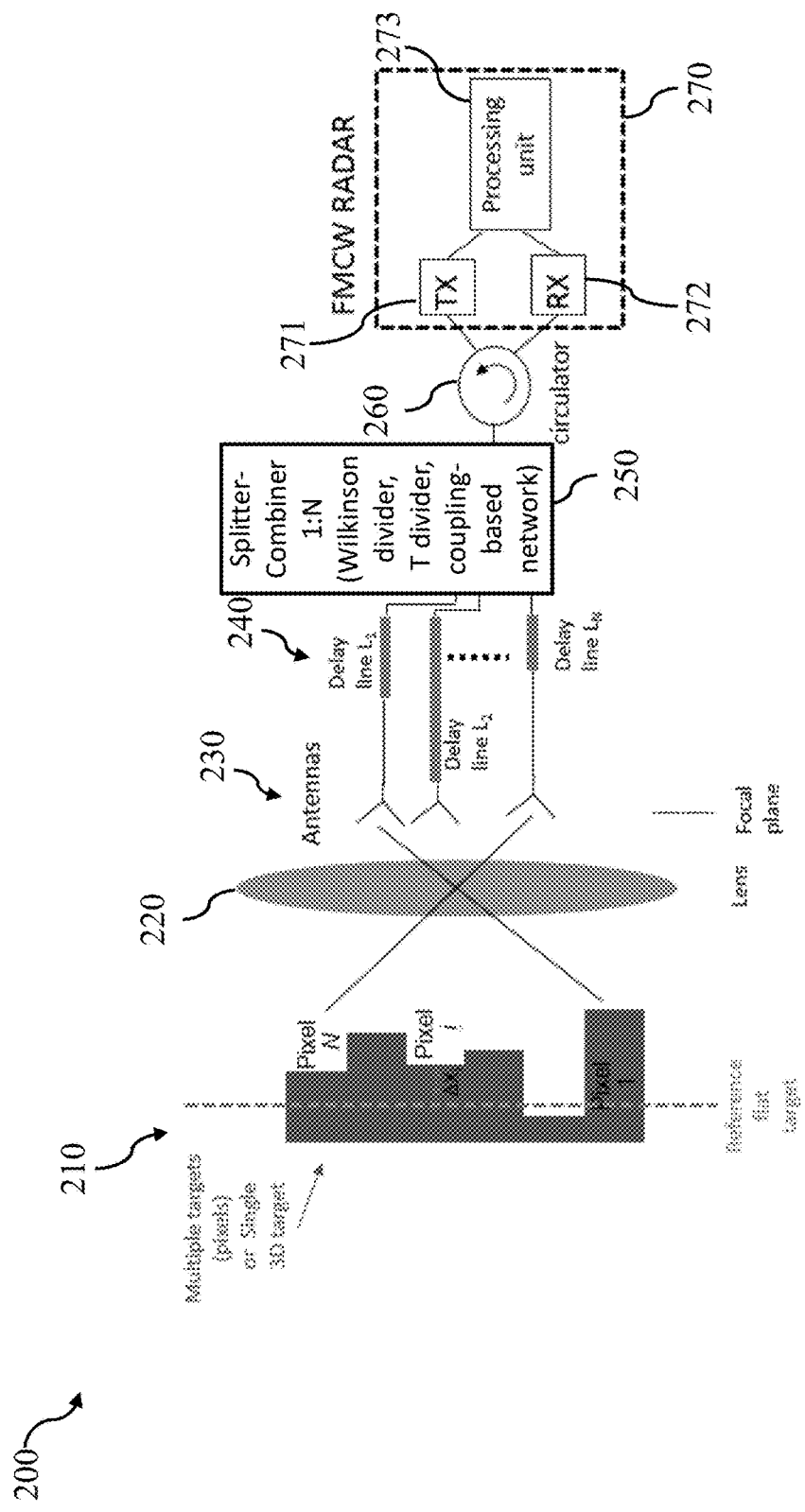
FIG. 2 illustrates a detailed system structure, according to an embodiment of the invention.

FIG. 2 illustrates a detailed system structure 200, according to an embodiment of the invention. For the sake of simplicity, the system's principles of operation are explained by assuming that a frequency modulated continuous wave (FMCW) radar is used. However, embodiments of the invention can be made with other types of radars, such as pulsed radars, and without major changes to other system components. The pulsed radar signal may be a frequency modulated pulsed radar signal or a phase modulated pulsed radar signal in various embodiments A single radar transmitter (TX) 271 in the radar 270 and a single radar receiver (RX) 272 can transmit and receive signals simultaneously by using a circulator 260 (or other type of coupler or divider which isolates the RX and TX signals). The transmitted signal is divided by the splitter/combiner 250 into N paths, each having a different delay $L_i$, where $i=1 \ldots N$.

Figure 3:
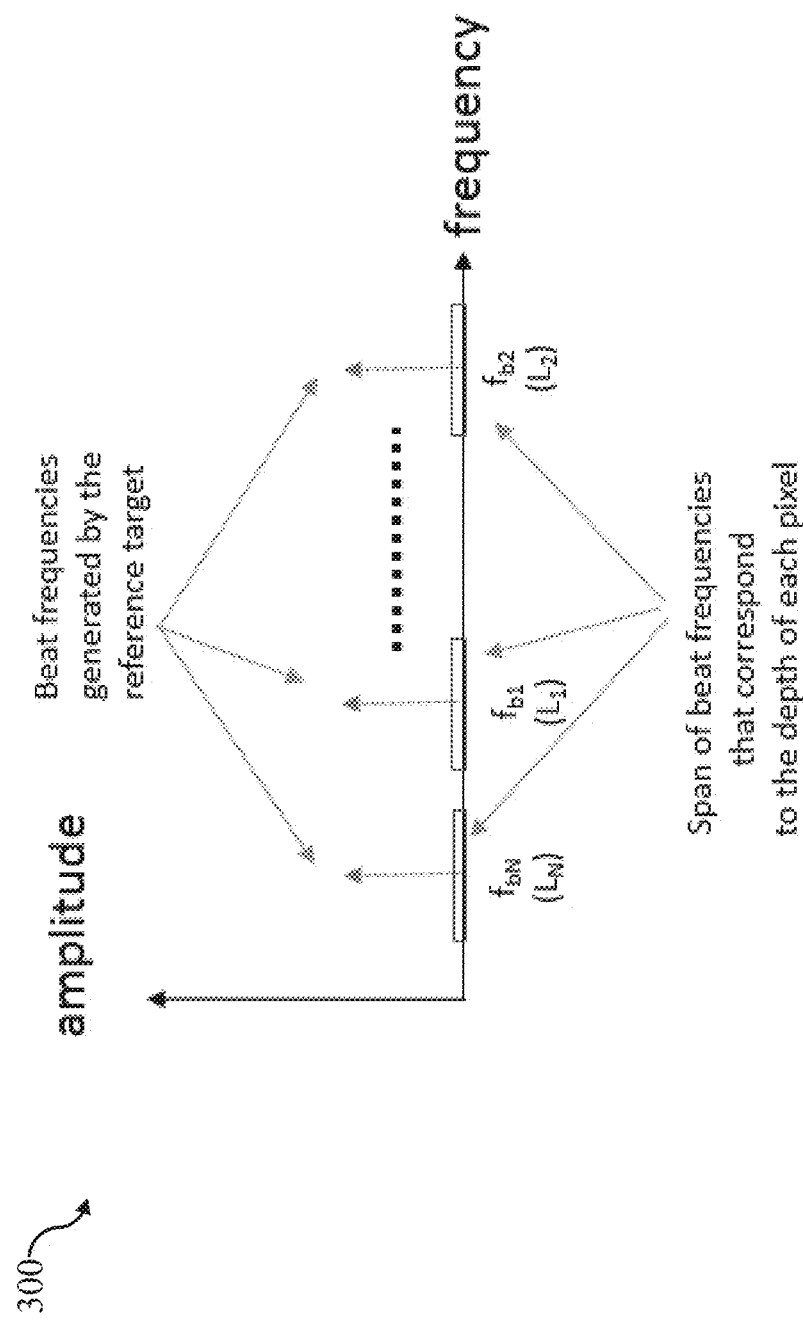
FIG. 3 illustrates a spectrum generated in the processing unit, according to an embodiment of the invention.

The splitter/combiner 250 can be a Wilkinson divider, T divider, coupling-based network, or other such types of splitters. The delay lines 240 are transmission lines in different lengths. The transmission lines in the system may be metallic waveguides or microstrip lines printed on a substrate, such as FR4, Duroid, other polytetrafluoroethylene (PTFE) substrates, or other substrate material. An antenna in the array of antennas 230 is connected at the far end of each delay line and it transmits the signal towards the target. Note that the radar transmitting antennas illuminating the target and the radar receiving antennas capturing the reflections from the target can be different or could be implemented by the same antenna. The antennas can be realized using metallic horns, printed patches, etc. A focusing lens 220 directs the radiation emitted by each antenna to a specific target 210 or to a specific pixel in the target. The waves reflected from each pixel in the target plane arrive back through the lens to the same antenna, summed in the splitter/combiner 250, and finally reach to the receiver. FIG. 3 illustrates a spectrum 300 generated in the processing unit, according to an embodiment of the invention. For a reference flat target, N different beat frequencies $f_{b1} \ldots f_{bN}$ that correspond to the delays $L_1 \ldots L_N$, will be generated in the radar processing unit 273 as shown in the arrows in FIG. 3. For pulsed radars, the different delays to the different pixels on the target face or to the multiple targets will cause the reflected signal to arrive at a different times $t_r$ at the radar receiver. The delay can be calibrated to a reference flat target. For multiple pixels with different offsets $\Delta X_i$ relative to the reference target, each beat frequency that is associated to a certain delay-line will shift inside the span marked by the rectangles in FIG. 3. To avoid ambiguity, the (uniform) length increasing step between the delay lines $\Delta L = L_{i+1} - L_i \forall i$, should be larger than the maximum depth changes in the target profile $\Delta X_{max} = \max \{\Delta X_i\}$. Moreover, in order to efficiently illuminate the lens, it is recommended that the delays are arranged in random order such that a quasi-omni pattern will be generated by the antenna array and the antenna patterns will not interfere coherently, which would otherwise steer the beam.

In alternative embodiments, several identical units that include single transceiver and a passive array can be integrated as sub-module tiles to form a larger system. In this way, larger targets, depths ($\Delta X$), and ranges can be detected. Switching between the tiles can be done in time domain. In addition, to improve the lens/reflector illumination efficiency, a high focal ratio (F-number) can be used.

Interference caused by antennas that illuminate more than one pixel or by pixels that scatter waves to adjacent pixels can be reduced by a proper design of the system (delays, array, lens, etc.). Moreover, it is possible to use these low amplitude interfering waves as additional information about the target topology by employing, for example, super-resolution algorithms.

Similar to DBF radar which can simultaneously detect multiple pixels, the invention, in embodiments, captures all the target information at once in the frequency domain. However, compared to DBF that require multiple active components and heavy processing capabilities, embodiments of the invention require only a single active component and a simple detection process.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An apparatus for three-dimensional (3D) detection comprising:
   a single radar transmitter connected to a set of at least one plurality of delay lines;
   a set of at least one an antenna array comprising a plurality of antennas, wherein each antenna in the set of at least one plurality of antennas is individually coupled to a delay line in the set of at least one plurality of delay lines, wherein each delay line has a different delay, wherein a position of each antenna in the set of at least one plurality of antennas is known and wherein a delay of each coupled delay line is known;
   a radar receiver configured to receive a reflected radar signal; and
   a signal processing unit;
   wherein the radar transmitter is configured to generate a radar signal that is delayed by the set of at least one plurality of delay lines, transmitted by the set of at least one plurality of antennas, and directed by a lens;
   wherein the signal processing unit is configured to determine a 3D target parameter feature of a 3D target having a plurality of pixels based on a plurality of beat frequencies in the received reflected radar signal, wherein the plurality of beat frequencies comprises a unique beat frequency corresponding to each of the plurality of delays, and to determine a range of each pixel of the 3D target and reconstruct a surface topology of the 3D target based on the known position of each antenna in the set of at least one plurality of antennas and on the known delay of each coupled delay line; and
   wherein for each pixel of the 3D target having a different distance offset, each of the plurality of beat frequencies is shifted within a range of frequencies and a length increasing step between the plurality of delay lines is larger than maximum depth changes between the distance offsets of the pixels in the target profile.

2. The apparatus of claim 1, wherein the radar signal comprises a continuous wave radar signal.

3. The apparatus of claim 2, wherein the continuous wave radar signal comprises a frequency modulated continuous wave radar signal.

4. The apparatus of claim 1, wherein the radar signal comprises a pulsed radar signal.

5. The apparatus of claim 4, wherein the pulsed radar signal comprises a frequency modulated pulsed radar signal.

6. The apparatus of claim 4, wherein the pulsed radar signal comprises a phase modulated pulsed radar signal.

7. The apparatus of claim 1, wherein the single radar transmitter is connected to the set of at least one delay lines by a coupler.

8. The apparatus of claim 4, wherein the coupler comprises a Wilkinson divider.

9. The apparatus of claim 4, wherein the coupler comprises a T divider.

10. The apparatus of claim 4, wherein the coupler comprises a coupling-based network.

11. The apparatus of claim 1, wherein the set of at least one delay lines comprises a set of microstrip lines.

12. The apparatus of claim 1, wherein the set of at least one delay lines comprises a set of waveguides.

13. A method for three-dimensional (3D) detection comprising:
    generating a radar signal by a radar transmitter, wherein the radar signal comprises a first frequency;
    delaying the radar signal by a plurality of delay lines, wherein each delay line has a different delay to generate a plurality of delayed radar signals;
    transmitting the plurality of delayed radar signals by an antenna array comprising a plurality of antennas wherein each antenna is individually coupled to a delay line, wherein a position of each antenna in the plurality of antennas is known and wherein a delay of each coupled delay line is known;
    directing the transmitted set of delayed radar signals by a lens;
    receiving a set of reflected radar signals by the antenna array;
    delaying the received set of reflected radar signals by the set of delay lines to generate a set of delayed reflected radar signals;
    processing the set of delayed reflected radar signals by a radar receiver to determine a 3D target parameter feature of a 3D target having a plurality of pixels based on a plurality of beat frequencies in the set of delayed reflected radar signals, wherein the plurality of beat frequencies comprises a unique beat frequency corresponding to each of the plurality of delays, and to determine a range of each pixel of the 3D target and reconstruct a surface topology of the 3D target based on the known position of each antenna in the set of at least one plurality of antennas and on the known delay of each coupled delay line; and
    wherein for each pixel of the 3D target having a different distance offset, each of the plurality of beat frequencies is shifted within a range of frequencies and a length increasing step between the plurality of delay lines is larger than maximum depth changes between the distance offsets of the pixels in the target profile.

14. The method of claim 13, wherein the radar signal comprises a continuous wave radar signal.

15. The method of claim 14, wherein the continuous wave radar signal comprises a frequency modulated continuous wave radar signal.

16. The method of claim 13, wherein the radar signal comprises a pulsed radar signal.

17. The method of claim 16, wherein the pulsed radar signal comprises a frequency modulated pulsed radar signal.

18. The method of claim 17, wherein the pulsed radar signal comprises a phase modulated pulsed radar signal.

19. A system comprising:
- a radar transmitter/receiver configured to generate a radar signal and receive a reflected radar signal;
- a signal splitter/combiner coupled to the radar transmitter/receiver and configured to split the radar signal into a plurality of radar signals;
- an array of delay lines comprising a plurality of delay lines coupled to the signal splitter combiner and configured to generate a plurality of delayed radar signals, wherein each delay line has a different delay;
- an array of antennas comprising a plurality of antennas coupled to the array of delay lines and configured to transmit the plurality of delayed radar signals, wherein a position of each antenna in the plurality of antennas is known and wherein a delay of each coupled delay line is known;
- a lens configured to redirect the transmitted set of delayed radar signals;
- a radar processing unit coupled to the radar transmitter/receiver and configured to generate a radar measurement of a 3D target having a plurality of pixels based on a beat frequency in the plurality of beat frequencies in a received reflected radar signal, wherein the plurality of beat frequencies comprises a unique beat frequency corresponding to each of the plurality of delays, and to determine a range of each pixel of the 3D target and reconstruct a surface topology of the 3D target based on the known position of each antenna in the set of at least one plurality of antennas and on the known delay of each coupled delay line; and
- wherein for each pixel of the 3D target having a different distance offset, each of the plurality of beat frequencies is shifted within a range of frequencies and a length increasing step between the plurality of delay lines is larger than maximum depth changes between the distance offsets of the pixels in the target profile.

* * * * *